(12) United States Patent
Olarig et al.

(10) Patent No.: US 11,847,068 B2
(45) Date of Patent: *Dec. 19, 2023

(54) ETHERNET-ATTACHED SSD FOR AUTOMOTIVE APPLICATIONS

(71) Applicant: Samsung Electronics Co., Ltd., Suwon-si (KR)

(72) Inventors: Sompong Paul Olarig, Pleasanton, CA (US); David Schwaderer, Saratoga, CA (US); Oscar Prem Pinto, San Jose, CA (US); Jason Martineau, Milpitas, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 49 days.

This patent is subject to a terminal disclaimer.

(21) Appl. No.: 17/370,933

(22) Filed: Jul. 8, 2021

(65) Prior Publication Data
US 2021/0334221 A1 Oct. 28, 2021

Related U.S. Application Data

(63) Continuation of application No. 16/800,878, filed on Feb. 25, 2020, now Pat. No. 11,080,208, which is a
(Continued)

(51) Int. Cl.
*G06F 12/14* (2006.01)
*H04N 5/77* (2006.01)
(Continued)

(52) U.S. Cl.
CPC ...... *G06F 12/1425* (2013.01); *G06F 12/1433* (2013.01); *G06F 21/10* (2013.01);
(Continued)

(58) Field of Classification Search
CPC .. G06F 12/1425; G06F 12/1433; G06F 21/10; G06F 21/6227; G06F 2212/1052;
(Continued)

(56) References Cited

U.S. PATENT DOCUMENTS 6,198,996 B1 * 3/2001 Berstis ................. B60R 25/241
726/20
7,254,482 B2 8/2007 Kawasaki et al.
(Continued)

FOREIGN PATENT DOCUMENTS

| EP | 2178052 | 4/2010 |
|---|---|---|
| KR | 20000071293 A | 11/2000 |

(Continued)

OTHER PUBLICATIONS

"The Connected Car", Marvell Solutions Automotive, downloaded Apr. 24, 2017, htlps:/lwww.marvell.com/solutions/1:1utomolive, 1 page.

*Primary Examiner* — J. Brant Murphy
(74) *Attorney, Agent, or Firm* — Lewis Roca Rothergerber Christie LLP

(57) ABSTRACT

A data storage device includes: a housing integrating a control logic, a data protection logic, and a non-volatile storage; and a network interface connector integrated to the housing and is configured to be directly inserted into a network switch. The control logic is configured to store a vehicle data including a video stream in the non-volatile storage. The video stream is received from a video camera that is connected to the network switch. The data protection logic is configured to detect a vehicle event and change an operating mode of the data storage device to a read-only mode prohibiting the vehicle data stored in the non-volatile storage from being erased or tampered.

20 Claims, 3 Drawing Sheets

Related U.S. Application Data continuation of application No. 15/677,945, filed on Aug. 15, 2017, now Pat. No. 10,606,767.

(60) Provisional application No. 62/508,821, filed on May 19, 2017.

(51) Int. Cl.

| | | |
|---|---|---|
| *H04N 5/907* | (2006.01) | |
| *H04N 5/445* | (2011.01) | |
| *G06F 21/62* | (2013.01) | |
| *G07C 5/08* | (2006.01) | |
| *H04N 9/82* | (2006.01) | |
| *G06F 21/10* | (2013.01) | |
| *H04N 23/698* | (2023.01) | |
| *H04N 7/18* | (2006.01) | |

(52) U.S. Cl.
CPC ....... *G06F 21/6227* (2013.01); *G07C 5/0866* (2013.01); *H04N 5/44504* (2013.01); *H04N 5/77* (2013.01); *H04N 5/772* (2013.01); *H04N 5/907* (2013.01); *H04N 9/8205* (2013.01); *H04N 23/698* (2023.01); *G06F 2212/1052* (2013.01); *G06T 2207/30248* (2013.01); *G06T 2207/30252* (2013.01); *H04N 7/183* (2013.01)

(58) Field of Classification Search
CPC ........ G06F 21/79; G06F 3/067; G06F 3/0623; G06F 3/0679; G07C 5/0866; G07C 5/008; G07C 5/085; G07C 5/0858; H04N 5/23238; H04N 5/44504; H04N 5/77; H04N 5/772; H04N 5/907; H04N 9/8205; H04N 7/183; H04N 21/23614; G06T 2207/30248; G06T 2207/30252; Y02D 10/00; H04L 49/351
See application file for complete search history.

(56) References Cited

U.S. PATENT DOCUMENTS

| | | | | |
|---|---|---|---|---|
| 8,467,324 | B2* | 6/2013 | Yousefi | B60R 19/03 370/328 |
| 9,558,147 | B2 | 1/2017 | Concer et al. | |
| 9,569,312 | B2 | 2/2017 | Taveniku | |
| 9,584,983 | B2 | 2/2017 | Rawlinson et al. | |
| 10,019,181 | B2* | 7/2018 | Singh | G06F 3/0659 |
| 10,079,781 | B2* | 9/2018 | Cheng | H04L 45/021 |
| 10,116,873 | B1* | 10/2018 | Campbell | G06V 20/59 |
| 10,386,199 | B2 | 8/2019 | Ko | |
| 2002/0003571 | A1* | 1/2002 | Schofield | B60S 1/0885 348/148 |
| 2003/0125854 | A1* | 7/2003 | Kawasaki | G07C 5/008 701/431 |
| 2003/0152145 | A1* | 8/2003 | Kawakita | H04N 7/088 348/E7.086 |
| 2003/0236945 | A1* | 12/2003 | Nahum | G06F 3/0665 711/114 |
| 2010/0070107 | A1* | 3/2010 | Berkobin | G07C 5/008 701/1 |
| 2010/0225738 | A1* | 9/2010 | Webster | B60R 11/04 348/36 |
| 2011/0102591 | A1* | 5/2011 | Yoon | G07C 5/0866 348/148 |
| 2012/0109407 | A1 | 5/2012 | Yousefi et al. | |
| 2012/0109446 | A1 | 5/2012 | Yousefi et al. | |
| 2012/0109447 | A1 | 5/2012 | Yousefi et al. | |
| 2012/0110356 | A1* | 5/2012 | Yousefi | G06F 1/26 713/320 |
| 2012/0197856 | A1* | 8/2012 | Banka | H04L 67/2885 707/706 |
| 2013/0091379 | A1* | 4/2013 | Taveniku | G06F 11/1428 714/6.3 |
| 2015/0054958 | A1* | 2/2015 | Kim | G07C 5/0866 348/149 |
| 2015/0103179 | A1* | 4/2015 | Galvin | H04N 21/6125 348/159 |
| 2015/0109450 | A1* | 4/2015 | Walker | H04N 9/79 348/148 |
| 2015/0145951 | A1* | 5/2015 | Ko | H04N 5/23238 348/149 |
| 2015/0160827 | A1* | 6/2015 | Hyun | G06F 3/0482 715/821 |
| 2015/0235484 | A1* | 8/2015 | Kraeling | G07C 5/0866 701/1 |
| 2015/0244994 | A1* | 8/2015 | Jang | H04N 5/232 348/148 |
| 2015/0319582 | A1* | 11/2015 | Rawlinson | H04W 4/40 455/456.1 |
| 2015/0363355 | A1* | 12/2015 | Concer | G06F 15/167 709/214 |
| 2016/0008985 | A1* | 1/2016 | Kim | G06F 1/18 901/1 |
| 2016/0065908 | A1* | 3/2016 | Chang | G06F 21/79 348/158 |
| 2016/0086333 | A1* | 3/2016 | Scholl | B60R 1/00 701/300 |
| 2016/0116972 | A1* | 4/2016 | Shin | G06F 3/0619 711/162 |
| 2016/0275790 | A1* | 9/2016 | Kang | G08G 1/096716 |
| 2016/0292936 | A1* | 10/2016 | Palmer | G07C 5/08 |
| 2016/0328254 | A1* | 11/2016 | Ahmed | G06F 9/45545 |
| 2016/0344983 | A1* | 11/2016 | Yoshimura | H04N 5/77 |
| 2016/0364197 | A1* | 12/2016 | Cho | G08G 1/0175 |
| 2017/0031906 | A1* | 2/2017 | Yang | G06T 1/20 |
| 2017/0053461 | A1* | 2/2017 | Pal | G06V 20/597 |
| 2017/0101110 | A1* | 4/2017 | Yoo | B60W 50/08 |
| 2017/0113664 | A1* | 4/2017 | Nix | G06V 20/56 |
| 2017/0132476 | A1* | 5/2017 | Chien | G06T 5/005 |
| 2017/0323540 | A1* | 11/2017 | Boykin | H04N 21/4394 |
| 2017/0327138 | A1* | 11/2017 | Jordan | G06V 20/52 |
| 2018/0082135 | A1* | 3/2018 | Crawford | G06V 20/56 |
| 2018/0225808 | A1* | 8/2018 | Chakraborty | G06T 11/60 |
| 2018/0330610 | A1* | 11/2018 | Wu | G06V 20/56 |
| 2019/0291642 | A1* | 9/2019 | Chae | G06T 7/30 |

FOREIGN PATENT DOCUMENTS

| | | |
|---|---|---|
| KR | 10-2012-0077455 A | 7/2012 |
| KR | 20130086363 A | 8/2013 |
| KR | 20140143919 | 12/2014 |
| KR | 20160046476 A | 4/2016 |
| KR | 20170007099 A | 1/2017 |
| KR | 10-2017-0042712 A | 4/2017 |

* cited by examiner

ETHERNET-ATTACHED SSD FOR AUTOMOTIVE APPLICATIONS

CROSS-REFERENCE TO RELATED APPLICATION(S)

This application is a continuation application of U.S. patent application Ser. No. 16/800,878 filed Feb. 25, 2020, which is a continuation application of U.S. patent application Ser. No. 15/677,945 filed Aug. 15, 2017, which claims the benefits of and priority to U.S. Provisional Patent Application Ser. No. 62/508,821 filed May 19, 2017, the disclosures of which are incorporated herein by reference in their entirety.

TECHNICAL FIELD

The present disclosure relates generally to solid-state drives (SSDs), more particularly, to an Ethernet-attached SSD targeted for automotive applications.

BACKGROUND

There is a growing interest in in-vehicle computing applications for autonomous vehicles. Autonomous self-driving vehicles are required to sense the surroundings, navigate through obstacles and paths, and make their own decisions without human interruption. Autonomous vehicles can achieve the sensing of the surroundings using a variety of on-board computing and sensing resources such as a radar, a light detection and ranging (LIDAR), a global positioning system (GPS), an odometer, and a computer-aided vision. Autonomous driving therefore requires a host of peripheral sensors that can deliver sensory data to processing elements. In addition, autonomous driving can be well served by gathering road conditions, restrictions (e.g., speed limits), and other information from the cloud and Internet sources, for example, Google Maps, CalTrans, Waze®, cellular phone towers, etc. Moreover, in accidental and unpredictable events such as a collision and a violation, drivers of the vehicle can benefit from having a video recording. Because collisions can occur from any direction, it is desirable to have a video that can provide a wide-angle visibility such as a 360° video camera.

The recording media of vehicle conditions and sensory information including video recording is desired to be secure and protected. A black box can survive after a crash or any other event while providing secure retention of the recorded data received from various components of the vehicle (e.g., engine, brakes) and audio and video recording from the cabin. All such data should be securely retained until deliberately deleted or over-written after a recovery of the data by an authorized party.

SUMMARY

A data storage device includes: a housing integrating a control logic, a data protection logic, and a non-volatile storage; and a network interface connector integrated to the housing and is configured to be directly inserted into a network switch. The control logic is configured to store a vehicle data including a video stream in the non-volatile storage. The video stream is received from a video camera that is connected to the network switch. The data protection logic is configured to detect a vehicle event and change an operating mode of the data storage device to a read-only mode prohibiting the vehicle data stored in the non-volatile storage from being erased or tampered.

A data storage and retention system includes: a network switch including a plurality of switch ports and a CPU; a video camera configured to generate a video stream; and a data storage device including a housing that integrates a control logic, a data protection logic, and a non-volatile storage; and a network interface connector integrated to the housing. The video camera is connected to a first switch port of the network switch and the data storage device is directly inserted into a second switch port of the network switch. The control logic of the data storage device is configured to store a vehicle data including the video stream generated by the video camera in the non-volatile storage. The data protection logic of the data storage device is configured to detect a vehicle event and change an operating mode of the data storage device to a read-only mode prohibiting the vehicle data stored in the non-volatile storage from being erased or tampered.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
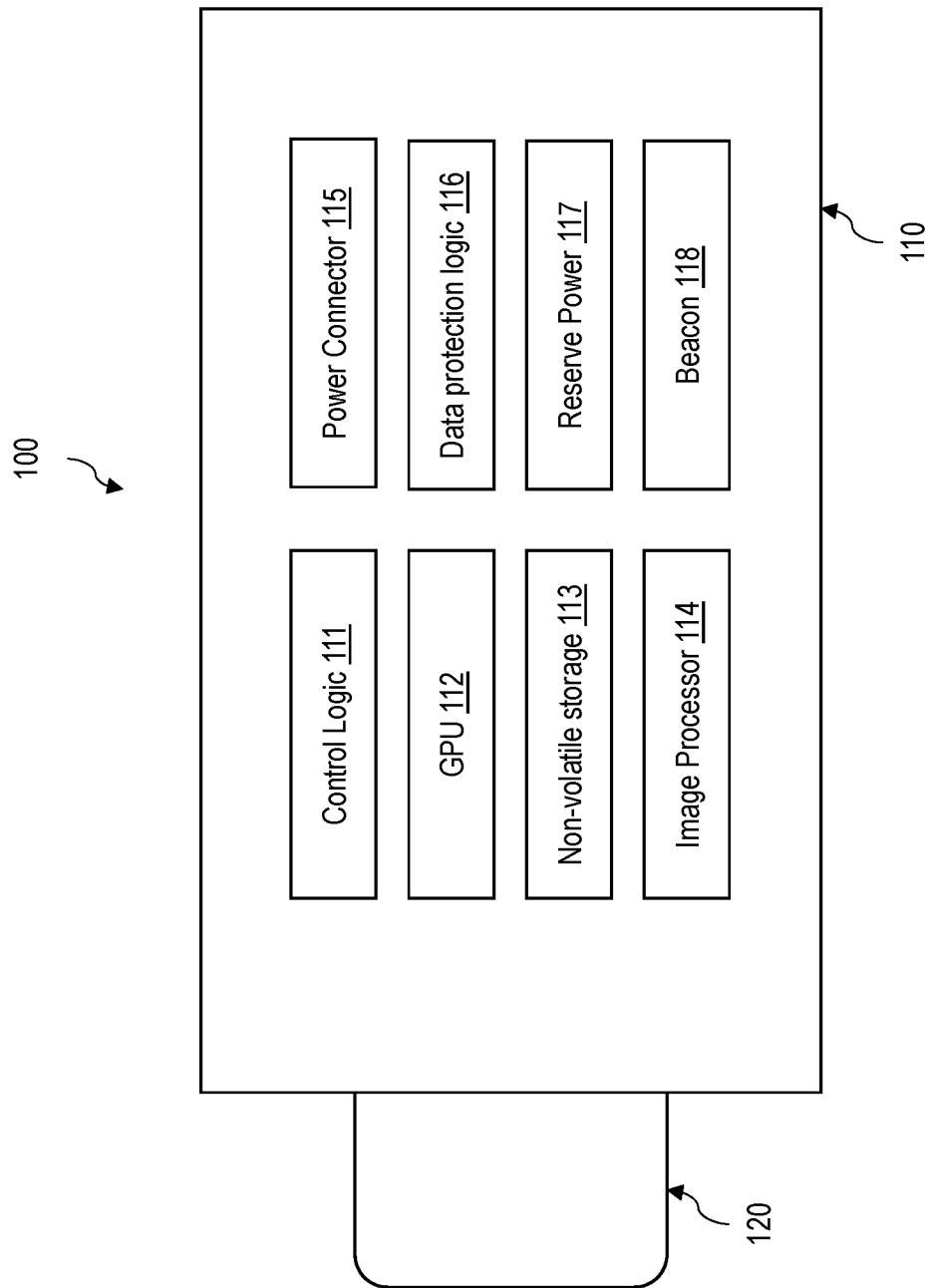
FIG. 1 is a schematic view of an example data storage device, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a data storage device for automotive applications. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure generally describes a data storage device configured for securely storing video streams and vehicle data for an automotive application. The vehicle data can be generated from a vehicle such as engine data and sensory data can be used along with the video streams to infer the condition of the vehicle and passengers in a specific event, for example, deployment of an airbag, hard braking, hard acceleration, etc. A raw video stream may be generated by a 360° video camera or multiple video cameras, and the present data storage device can generate the vehicle stream in various formats, sizes, and resolutions embedded with or coupled to the vehicle data.

According to one embodiment, the present data storage device can be used for an autonomous vehicle. The autonomous vehicle may need data processing and retention of vehicle data for the safety and liability of the vehicle manufacturer and/or owner in an event of an accident. The vehicle data can be time and coordinate-stamped using an integrate timer and a GPS to prevent tampering of the vehicle data in the data storage device by an unauthorized party.

According to one embodiment, the present data storage device is a solid-state drive (SSD) having a small form factor and. The SSD can be attached to a network switch having a switch port form factor that is compatible with the small form factor of the SSD. For example, the data storage device may be compatible with a small form-factor pluggable (SFP), an enhanced small form-factor pluggable (SFP+), quad small form-factor pluggable (QSFP), or modular connector form factor, variants of such form factors or similar form factors, or another form factor that is insertable into a switch port and through which network communications may be transmitted. The data storage device may be directly insertable into the switch port of the network switch.

According to one embodiment, the present data storage device is an Ethernet-attached SSD, and the underlying network protocol of the network switch is Ethernet. It is understood that other underlying network protocols may be equally applied to provide the functionalities and features of the present data storage device. The present data storage device can securely store data received from other components of a vehicle or other vehicles via wireless communication. The present data storage device has several features and constraints that are required for the intended automotive application.

In some embodiments, the present data storage device is used for non-automotive applications without deviating from the scope of the present disclosure. For example, the present data storage device may be used for an autonomous robot servicing a factory, a shopping mall, or a premise for security monitoring, handling of hazardous materials, and assisting and saving human lives.

The small switch port form factor of the present data storage device facilitates easy adoption and deployment by car manufacturers for a data protection and/or retention solution. The small switch port form factor allows the present data storage device to be placed in a non-visible area within a vehicle. Compared to a conventional in-car network protocols such as control area network (CAN), the present data storage device can have a high bandwidth to process and store a large amount of data such as video streams. The switch port may have a low port count but can provide the high bandwidth required for video recording in the data storage device. Further, the network switch consumes less power due to a low port count compared to a high-performance, high-port count network switches targeted for other applications. Therefore, the network switch and/or the data storage device can operate longer on a reserve power in an emergency situation. The modular design of the system separating the network switch and the data storage device can be scaled depending on a target application whiling making the data storage and retrieval easy and secure.

According to one embodiment, the present data storage device has a built-in tamper-proofing logic. In this sense, the data storage device can serve as a black box that is intended to survive after a crash or any other events of interest. The recorded vehicle data can be securely retained until deliberately deleted or over-written after a recovery of the data by an authorized party.

When certain conditions are met, the data storage device can change to a read-only mode prohibiting the data stored in the data storage device from being tampered. For example, a vehicle can detect a catastrophic event such as an airbag deployment, a sensor trigger, a power loss due to water submersion or a fire due to a crash using various sensors equipped in the vehicle and/or stand-alone sensors embedded in the system. For example, an accelerometer equipped in the airbag of the vehicle or a stand-alone accelerometer in the switch port or the data storage device can detect a crash. After detecting the crash, the data storage device can change the mode to the read-only mode. In the read-only mode, the data that is already written on the present data storage device can be prevented from being overwritten. In some embodiments, the present data storage device can be set to have a specific range of logical block addresses (LB As) to be in the read-only mode after a crash while allowing to continuously write data. In some embodiments, the data storage device can continue to record scenes and conditions of the vehicle after the crash to provide useful evidence for a predetermined period after the crash if configured so. After the predetermine period of time for after-crash recording, the data storage device becomes write-disabled to prohibit the data tampering.

According to one embodiment, the present data storage device has a built-in beacon unit that can emit distress beacon signals. The beacon signals help the data storage device to be found in an adverse condition, for example, when the vehicle is submerged in water or lost from sight. The present data storage device can have a reserve power supply to operate the beacon unit in an emergency situation.

FIG. 1 is a schematic view of an example data storage device, according to one embodiment. The data storage device 100 includes a housing 110 and a network interface connector 120. The housing 110 includes a control logic 111, a graphics processing unit (GPU) 112, a non-volatile storage 113, an image processor 114, a power connector 115, a data protection logic 116, a reserve power 117, and a beacon unit 118.

The network interface connector 120 is integrated with the housing 110 and structured to be directly inserted into a network switch (not shown). In some embodiments, the network interface connector 120 is a wired connector suitable for an Ethernet, Fibre channel, InfiniB and, or other similar network or fabric.

The housing 110 is a frame that supports the various components of the data storage device 100. In some embodiments, the network interface connector 120 is integrated with the housing 110 such that at least some parts of the housing 110 are involved with mating the data storage device 100 to a network switch. In other embodiments, the network interface connector 120 may include structures related to mechanically interfacing with a network switch while the housing 110 remains separate from the network switch when the data storage device 100 is inserted.

The control logic 111 controls operations of the data storage device 100. In some embodiments, the control logic 111 includes a general-purpose processor, a digital signal processor (DSP), an application specific integrated circuit, a microcontroller, a programmable logic device, discrete circuits, a combination of such devices, or the like. The control logic 111 may include internal portions, such as registers, cache memory, processing cores, or the like, and may also include external and internal interfaces, such as address and data bus interfaces, interrupt interfaces, or the like. Although only one control logic 111 is illustrated in the data storage device 100, multiple control logics 111 may be present and operate to implement various functions of the data storage device 100 independently or in cooperation with each other. In addition, other interface devices, such as logic chipsets, hubs, memory controllers, communication interfaces, or the like may be a part of the data storage device 100 to connect the control logic 111 to internal and external components.

The GPU 112 is configured to process a raw video stream data received from an external video camera via the network interface connector 120 and generate a video stream. For example, the GPU 112 can decode the raw video stream data that is encoded with various encoding schemes (e.g., AVI, MPEG, DivX, WMV, MP4, MOV, RM, H.264/AVC, AVCHD, MKV, 3GP, and VOB) and generate a video stream. The GPU 112 can also change a format, size, and/or resolution of the video stream.

The non-volatile storage 113 is disposed on the housing 110. In some embodiments, the non-volatile storage 113 includes at least one nonvolatile memory, such as an electrically erasable programmable read-only memory (EEPROM), a flash memory, a phase change random-access memory (PRAM), a resistance random-access memory (RRAM), a magnetic random-access memory (MRAM), a ferroelectric random-access memory (FRAM), a nano-floating gate memory (NFGM), or a polymer random-access memory (PoRAM), combinations of such memories or similar memories, or the like.

In some embodiments, the control logic 111 and the non-volatile storage 113 are implemented as integrated circuits; these and other components can be mounted on a printed circuit board (PCB). The printed circuit board may be mounted on the housing 110. As described above the network interface connector 120 is integrated with the housing 110. In some embodiments, the PCB is the electrical interface of the network interface connector 120 while the housing 110 forms the mechanical interface. For example, one or more sides of the PCB may have traces that extend to an edge of the PCB. These traces may form the electrical interface to the storage device. The housing 110 may be configured to mechanically align the network interface connector 120 as the data storage device 100 is inserted into a corresponding socket so that the edge portion of the PCB including the traces is inserted into a connector within the socket.

The control logic 111 is configured to enable access to the non-volatile storage 113 through the network interface connector 120. In some embodiments, the operations that the control logic 111 is configured to perform are limited to network and storage related operations. In particular, the network and storage related operations are operations related to accessing the non-volatile storage 113. For example, network-related operations may include managing a physical network interface and operating a network stack to process packets received from and transmitted to the network. The storage-related operations may include receiving/transmitting commands/data according to a storage protocol encapsulated within a network protocol and/or receiving/transmitting commands/data through an expansion bus. In addition, storage-related operations may include accessing and/or managing the non-volatile storage 113 within the data storage device 100, such as reading and writing data, managing the non-volatile storage 113.

In some embodiments, the control logic 111 is configured to terminate one or more storage protocols and one or more network protocols. Terminating a protocol includes implementing an endpoint for that protocol. The data complying with the protocol is not forwarded to another device or system. Data encapsulated within the data complying with the protocol may be forwarded or used in some other manner, but the data complying with the protocol is not.

In some embodiments, the control logic 111 is a light-weight application-specific integrated circuit (ASIC) configured to terminate a storage protocol and network protocols. Once the commands/data according to the storage protocol are extracted from the network data, the control logic 111 is configured to access the non-volatile storage 113. As a result, the data storage device 100 need not include a general-purpose processor connected to a motherboard with expansion bus interfaces for network cards, conventional storage devices, or the like. In contrast, the control logic 111 merely terminates the storage protocol and network protocols and directly accesses the non-volatile storage 113 without an intermediary. In some embodiments, the control logic 111 does not include a general-purpose processor and only includes an ASIC configured to terminate the storage protocol and network protocols.

In some embodiments, the control logic 111 and the non-volatile storage 113 may be coupled without a connector. In one example, the control logic 111 is mounted on a PCB. Integrated circuits forming the non-volatile storage 113 are also mounted on the PCB. The control logic 111 and the non-volatile storage 113 communicate without using a connector. In other embodiments, the control logic 111 and the non-volatile storage 113 communicate without using an expansion bus such as small computer system interface (SCSI), peripheral component interconnect express (PCIe), mobile PCIe (M-PCIe), advanced technology attachment (ATA), parallel ATA (PATA), serial ATA (SATA), serial attached SCSI (SAS), integrated drive electronics (IDE), universal flash storage (UFS), Firewire, and/or the like.

The image processor 114 is configured to process the video stream generated by the GPU 112. For example, the image processor 114 can insert a vehicle-specific data that is synchronous to the video stream such as a time stamp and/or a coordinate stamp. The vehicle-specific data may be internally generated by the data storage device using a peripheral device or an integrated sensor. The image processor 114 can further alter, merge, edit the raw video image data into a format adequate for storage in the non-volatile storage 113. The image processor 114 can combine multiple raw video image data into a single video image data. The image processor 114 can compress or encrypt the video stream when saving to the non-volatile storage 113.

The power connector 115 provides a power from a network switch or an external power source. For example, a 12V DC power can be received from a cigarette lighter of a vehicle. The reserve power 117, for example a battery, can be optionally included in the housing 110 to supply power to the data storage device 100. The reserve power 117 can provide power to the data storage device 100 in case of an emergency. For example, the storage device 100 can continue to record scenes after a crash if configured so in cases the power received from the vehicle via the external power connector 115 is lost.

A vehicle in which the data storage device 100 is installed can send a trigger signal to the data storage device 110 via the network interface connector 120 indicating an occurrence of certain events such as an airbag deployment, a sensor trigger, a power loss due to water submersion or a fire due to a crash using various sensors (e.g., an accelerometer and a gyroscope) equipped in the vehicle. In some embodiments, the data storage device 100 or the network switch into which the data storage device 110 is inserted can include one or more embedded stand-alone sensors that can detect the occurrence of such events.

The data protection logic 116 can detect such an event and change the operating mode of the data storage device 100 to a read-only mode prohibiting the data stored in the data storage device 100 from being tampered or overwritten. In some embodiments, the data storage device 100 can continue to record vehicle data and other conditional information for a predetermined period after a crash to provide useful evidence of a crash. After the predetermined period of after-crash recording time expires, the data protection logic 116 can disable data writes to the data storage device 100 and change the operating mode of the data storage device 100 to the read-only mode to prohibit the data tampering.

The beacon unit 118 of the data storage device 100 can generate and issue distress beacon signals to help locating the data storage device 100, for example, when the vehicle is submerged under water. The beacon unit 118 may be triggered by the data protection logic 116 after a crash or a triggering event. The beacon unit 118 may be powered by the reserve power 117 after the crash until the data storage device 100 is retrieved.

Figure 2:
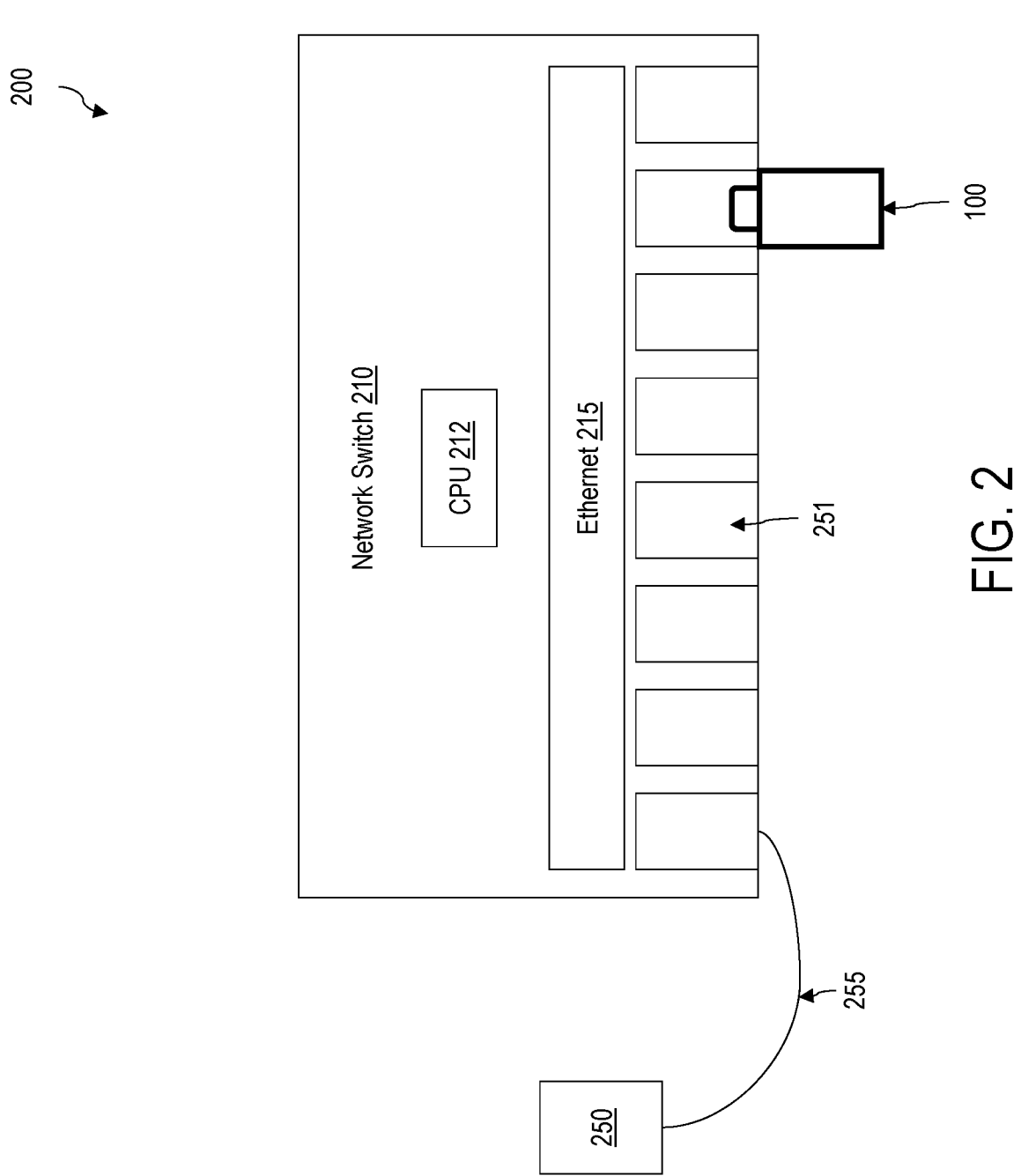
FIG. 2 shows an example data storage and retention system, according to one embodiment.

FIG. 2 shows an example data storage and retention system, according to one embodiment. The data storage and retention system 200 includes a network switch 210 having a plurality of switch ports 251, a data storage device 100, and a video camera 250. The network switch 210 includes a CPU 212 and an Ethernet switch 215. The video camera 250 can establish an Ethernet link to the network switch 210 for store data in the data storage device 100. Although FIG. 1 shows only one data storage device 100 and only one video camera 250, it is noted that any number of data storage devices 100 and video cameras 250 may be connected to the network switch 210. The number of switch ports 251 may correspond to an application. For example, for a single video camera and a single data storage device configuration, the network switch 210 can have two switch ports 251. The lower the number of switch ports 251, the more power-efficient the data storage and retention system 200 and the smaller the physical size of the data storage and retention system 200.

The video camera 250 can capture a raw video stream (e.g., 360-degree video stream) and sends the captured video stream to the network switch 210 via a network link 255. In the case of the Ethernet-attached SSD, the network is an in-vehicle Ethernet, and the network port is an Ethernet port. Institute of Electrical and Electronics Engineers (IEEE) provides a standard for the Ethernet in a car ("IEEE Standard for Ethernet, Amendment 1: Physical Layer Specifications and Management Parameters for 100 Mb/s Operation over a Single Balanced Twisted Pair Cable (100BASE-T1)," IEEE Std 802.3bw™-2015).

According to one embodiment, the video camera 250 can include a video stitching logic to stitch multiple video segments into a 360-degree video stream and a time-stamp logic to insert a time stamp to a video stream that it generates. According to one embodiment, a time data to be inserted into the video stream can be received from an external timer of the vehicle or a stand-alone timer embedded in the network switch 210 or the data storage device 100. For example, the network switch 210 may include a timer and insert a time stamp when transferring the video stream data received from the video camera 250 to the data storage device 100. In another example, the data storage device 100 includes a timer and can insert a time stamp when writing the video stream data to its non-volatile storage 113. The time-stamp and other vehicle information coupled to the video stream such as coordinate data generated from a GPS, the traffic data from Google Maps or Waze, the speed limit on the road where the accident occurred, are useful for determining a fault in an accident. The GPS can be integrated in the data storage device 100 or an external GPS may be used. The control logic 111 of the data storage device 100 can store a vehicle speed and a speed limit using the GPS data. The vehicle speed and the speed limit information can be used to alert the driver in real-time when the vehicle is speeding over the speed limit.

Other sensor devices of the vehicle can capture vehicle-specific sensor data and provide the captured data to the data storage device 100. The data storage device 100 can securely store the data along with the vehicle sensor data in a similar manner as an aircraft black box system.

According to one embodiment, the video stream data stored in the data storage device 100 is a 360-degree video stream data that can be viewed using a VR gear. The video stream data recoded in the data storage device 100 can be shared with another user using the VR gear. A user can virtually experience the progress of the travel experiences of another user from his/her own perspectives.

According to one embodiment, the network switch 210 includes at least two Ethernet ports. One of the Ethernet port is used for capturing a video stream from the video camera 250, and the other port is used for interfacing with the data storage device 100. The network switch 210 has a small number of dedicated low-power Ethernet ports so that it can reduce the power consumption while having a small footprint. This allows the data storage and retention system 200 to have an adequate data storage performance and tamper-proofing necessary to function as a black box system for a vehicle.

The CPU 212 of the network switch 210 can process the received data from the video camera 250 as well as other peripheral devices of the vehicle and store the processed data in the non-volatile storage of the data storage device 100 in real-time. The stored data in the data storage device 100 can be retrieved and reviewed later for investigation or leisure purposes. Prior to storing the video stream data to the non-volatile storage, the CPU 212 can stitch individual camera video streams into a single video stream data (e.g., spherical video stream data) to facilitate a review using a VR gear. While processing the video stream data, the CPU 212 can insert a time stamp or a coordinate stamp to the video stream data.

As the storage space of the non-volatile storage medium 113 fills up, the data storage and retention system 200 can notify the user to perform a backup or to wipe-out previously recorded data to free up a space for more recent data. Optionally, the CPU 212 can overwrite the data by default by overwriting the oldest data.

The data storage and retention system 200 can have a tamper-proof mode to provide a trustworthy evidence of an event. The data storage and retention system 200 can be sealed with a tamperproof tape to ensure the integrity of the data in case of a fatal accident and/or as an evidence in a court. In some embodiment, the data storage and retention system 200 may not be tamperproof and can be used as a consumer add-on product to allow the consumer to freely view and use the data.

Figure 3:
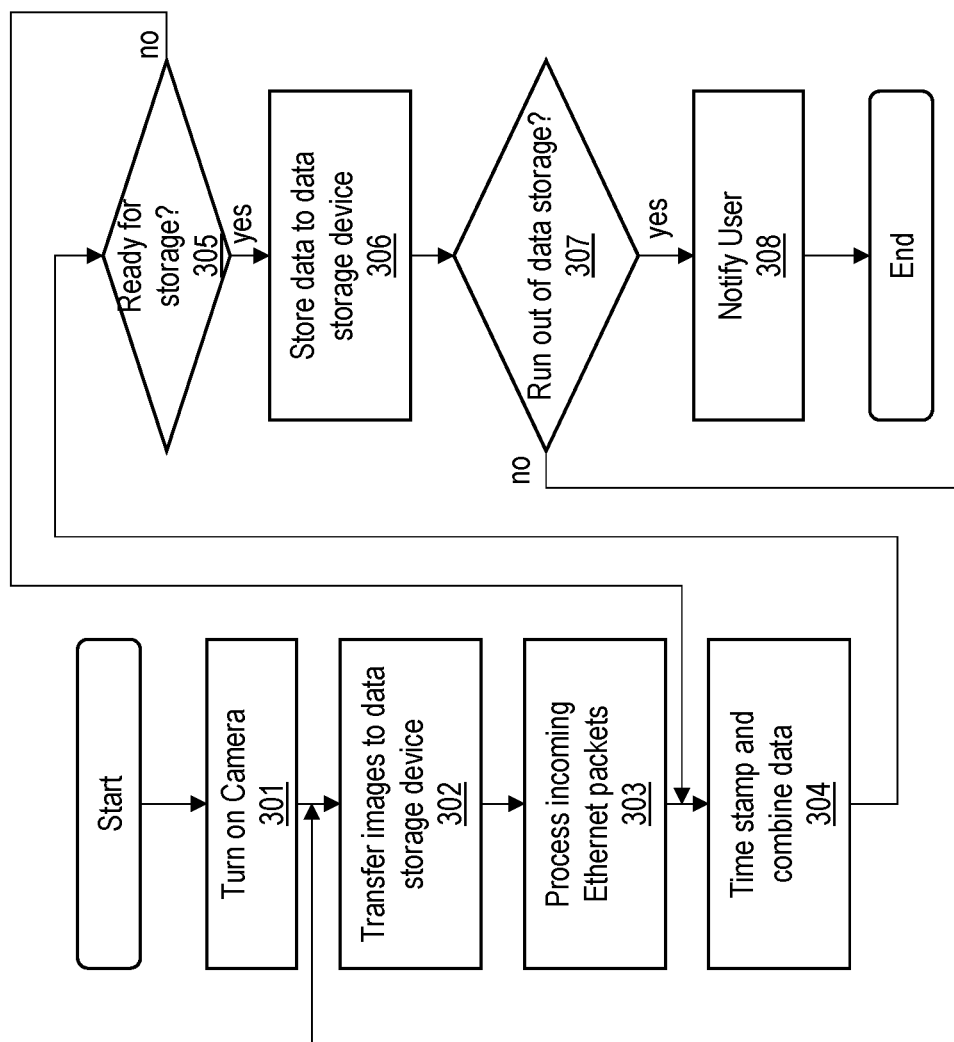
FIG. 3 is a flowchart for storing a vehicle-specific data to an example data storage device, according to one embodiment.

FIG. 3 is a flowchart for storing a vehicle-specific data to an example data storage device, according to one embodiment. A video camera connected to a network switch is turned on (301). In one embodiment, the video camera may be automatically turned on when a vehicle is started. The vehicle may be equipped with more than one video cameras, and they can be simultaneously turned on when the vehicle is started. The video camera starts to capture and transfer a raw video stream data to a data storage device that is also connected to the network switch (302). The data storage device may be an Ethernet-attached SSD, and the data may be transferred in Ethernet packets. The control logic of the data storage device processes the incoming Ethernet packets to generate a video stream (303) and insert a time stamp to the video stream (304). This process continues until a chunk of the video stream is ready to be stored in the data storage device. The encoding of the raw video stream data and the recoding of the encoded video stream can occur continuously and independently. When the video stream is ready for storage in the data storage device (305), the control logic of the data storage device stores the video stream to the non-volatile memory of the data storage device (306). When the non-volatile memory runs out of a data storage space (307), the control logic can notify a user in an auditory or visual queue (308).

A data storage device includes: a housing integrating a control logic, a data protection logic, and a non-volatile storage; and a network interface connector integrated to the housing and is configured to be directly inserted into a network switch. The control logic is configured to store a vehicle data including a video stream in the non-volatile storage. The video stream is received from a video camera that is connected to the network switch. The data protection logic is configured to detect a vehicle event and change an operating mode of the data storage device to a read-only mode prohibiting the vehicle data stored in the non-volatile storage from being erased or tampered.

The vehicle event may be one or more of an airbag deployment, a sensor trigger, a power loss due to water submersion, and a fire due to a crash.

The control logic may store the vehicle data in the data storage device for a predetermined period of time after the vehicle event.

The network interface connector may have a small form-factor pluggable (SFP), quad small form-factor pluggable (QSFP), or modular connector form factor.

The data storage device may be an Ethernet-attached solid-state drive (SSD) compatible with the NVMe-oF standard.

The video camera may be a 360-degree video camera and may be connected to the network switch via an Ethernet connection. The video camera may be configured to send the video stream to the network switch in Ethernet packets.

The data storage device may further include a reserve power and a beacon. The beacon may be triggered by the data protection logic after the vehicle event and may be configured to generate a beacon signal using the reserve power.

The data storage device may further include an image processor disposed in the housing. The image processor may be configured to insert a time stamp and/or a coordinate stamp to the video stream.

A data storage and retention system includes: a network switch including a plurality of switch ports and a CPU; a video camera configured to generate a video stream; and a data storage device including a housing that integrates a control logic, a data protection logic, and a non-volatile storage; and a network interface connector integrated to the housing. The video camera is connected to a first switch port of the network switch and the data storage device is directly inserted into a second switch port of the network switch. The control logic of the data storage device is configured to store a vehicle data including the video stream generated by the video camera in the non-volatile storage. The data protection logic of the data storage device is configured to detect a vehicle event and change an operating mode of the data storage device to a read-only mode prohibiting the vehicle data stored in the non-volatile storage from being erased or tampered.

The vehicle event may be one or more of an airbag deployment, a sensor trigger, a power loss due to water submersion, and a fire due to a crash.

The control logic of the data storage device may store the vehicle data in the data storage device for a predetermined period of time after the vehicle event.

The network interface connector of the data storage device and the switch port of the network switch may have a small form-factor pluggable (SFP), quad small form-factor pluggable (QSFP), or modular connector form factor.

The data storage device may be an Ethernet-attached solid-state drive (SSD) compatible with the NVMe-oF standard.

The video camera may be a 360-degree video camera and may be connected to the first switch port of the network switch via an Ethernet connection. The video camera may be configured to send the video stream to the network switch in Ethernet packets.

The data storage device may further include a reserve power and a beacon. The beacon may be triggered by the data protection logic after the vehicle event and may be configured to generate a beacon signal using the reserve power.

The data storage device may further include an image processor disposed in the housing. The image processor may be configured to insert a time stamp and/or a coordinate stamp to the video stream.

The CPU of the network switch may be configured to stitch multiple video streams generated by a plurality of video cameras connected to the switch ports of the network switch.

The CPU may be configured to generate a spherical video stream using the multiple video streams.

The CPU may be configured to insert a time stamp or a coordinate stamp to the video stream data.

The above example embodiments have been described hereinabove to illustrate various embodiments of implementing a system and method for providing an Ethernet-attached SSD for automotive applications. Various modifications and departures from the disclosed example embodiments will occur to those having ordinary skill in the art. The subject matter that is intended to be within the scope of the invention is set forth in the following claims.

What is claimed is:

1. A data storage device comprising:
a control logic;
a data protection logic;
a non-volatile storage; and
a network interface adapter configured to connect to a network,
wherein the control logic is configured to store data received from a sensor connected to the network, in the non-volatile storage,
wherein the data protection logic is configured to detect an event based on the data received from the sensor and change an operating mode of the data storage device from a first mode to a second mode based on detection of the event, and
wherein in the first mode, the data storage device is configured to control the data stored in the non-volatile storage in a first manner, and in the second mode the data storage device is configured to control the data stored in the non-volatile storage in a second manner.

2. The data storage device of claim 1, wherein the event is a vehicle event including one or more of an airbag deployment, a sensor trigger, a power loss due to water submersion, and a fire due to a crash.

3. The data storage device of claim 1, wherein the control logic stores the data in the data storage device for a predetermined period of time after the event.

4. The data storage device of claim 1, wherein the network interface adapter has a small form-factor pluggable (SFP), quad small form-factor pluggable (QSFP), or modular connector form factor.

5. The data storage device of claim 1, wherein the data storage device is a network-attached solid-state drive (SSD).

6. The data storage device of claim 1, wherein the sensor includes a video camera that is connected to the network, and wherein the video camera is configured to send a video stream to the network in network packets.

7. The data storage device of claim 1, further comprising a reserve power and a beacon, wherein the beacon is triggered by the data protection logic after the event and is configured to generate a beacon signal using the reserve power.

8. The data storage device of claim 1, further comprising an image processor, wherein the image processor is configured to insert a time stamp and/or a coordinate stamp to the data.

9. A system comprising:
a network comprising switch ports and a processor;
a sensor configured to generate data;
a data storage device comprising a control logic, a data protection logic, and a non-volatile storage; and
a network interface adapter,
wherein the sensor is connected to a first switch port of the network and the data storage device is connected to a second switch port of the network,
wherein the control logic of the data storage device is configured to store the data generated by the sensor in the non-volatile storage, and
wherein the data protection logic of the data storage device is configured to detect an event based on the data generated by the sensor and change an operating mode of the data storage device from a first mode to a second mode based on detection of the event, and
wherein in the first mode, the data storage device is configured to control the data stored in the non-volatile storage in a first manner, and in the second mode the data storage device is configured to control the data stored in the non-volatile storage in a second manner.

10. The system of claim 9, wherein the event is a vehicle event including one or more of an airbag deployment, a sensor trigger, a power loss due to water submersion, and a fire due to a crash.

11. The system of claim 9, wherein the control logic of the data storage device stores the data in the data storage device for a predetermined period of time after the event.

12. The system of claim 9, wherein the network interface adapter of the data storage device and at least one of the switch ports of the network have a small form-factor pluggable (SFP), quad small form-factor pluggable (QSFP), or modular connector form factor.

13. The system of claim 9, wherein the data storage device is a network-attached solid-state drive (SSD).

14. The system of claim 9, wherein the sensor includes a video camera that is connected to the first switch port of the network, and wherein the video camera is configured to send a video stream to the network in network packets.

15. The system of claim 9, wherein the data storage device further comprises a reserve power and a beacon, wherein the beacon is triggered by the data protection logic after the event and is configured to generate a beacon signal using the reserve power.

16. The system of claim 9, wherein the data storage device further comprises an image processor, wherein the image processor is configured to insert a time stamp and/or a coordinate stamp to a video stream.

17. The system of claim 9, wherein the processor of the network is configured to stitch multiple video streams generated by video cameras connected to the switch ports of the network.

18. The system of claim 17, wherein the processor is configured to generate a spherical video stream using the multiple video streams.

19. The system of claim 9, wherein the processor is configured to insert a time stamp or a coordinate stamp to the data.

20. A method comprising:
receiving data from a sensor that is connected to a network via a network interface of a data storage device;
storing the data in a non-volatile storage of the data storage device;
detecting an event based on the data received from the sensor; and
changing an operating mode of the data storage device from a first mode to a second mode based on detection of the event,
wherein in the first mode, the data storage device is configured to control the data stored in the non-volatile storage in a first manner, and in the second mode the data storage device is configured to control the data stored in the non-volatile storage in a second manner.

* * * * *